United States Patent [19]

Matsumura et al.

[11] Patent Number: 4,505,729
[45] Date of Patent: Mar. 19, 1985

[54] METHOD OF PRODUCING OPTICAL FIBER PREFORM

[75] Inventors: Hiroyoshi Matsumura, Iruma; Toshio Katsuyama, Hachioji; Tsuneo Suganuma, Tokorozawa, all of Japan

[73] Assignee: Hitachi, Ltd., Tokyo, Japan

[21] Appl. No.: 542,186

[22] Filed: Oct. 14, 1983

[30] Foreign Application Priority Data

Oct. 15, 1982 [JP] Japan ................. 57-179857

[51] Int. Cl.³ .............................. C03C 25/02
[52] U.S. Cl. .......................... 65/3.11; 65/2; 65/3.12; 350/96.31
[58] Field of Search ............... 65/1, 2, 13, 3.12, 3.11; 350/96.31

[56] References Cited

U.S. PATENT DOCUMENTS 4,184,859  1/1980  Maklad ........................ 65/2
4,283,213  8/1981  Akers et al. ................. 65/2 X

FOREIGN PATENT DOCUMENTS 131043  10/1979  Japan ......................... 65/2
2106892  4/1983  United Kingdom ......... 65/3.12

Primary Examiner—Robert Lindsay
Attorney, Agent, or Firm—Antonelli, Terry & Wands

[57] ABSTRACT

A method of producing a preform for a single-polarization optical fiber wherein a glass rod to become a core or a glass rod to become a clad is inserted into a quartz tube which has on its inner wall surface a glass thin film to become a clad layer, a glass thin film to become a jacket layer or glass films to become a jacket layer and a clad layer, and wherein under a state under which the internal pressure of the quartz tube is reduced, the quartz tube is heated to become solid, whereby at least one of the clad and the jacket of the optical fiber preform becomes elliptic in cross section.

21 Claims, 7 Drawing Figures

METHOD OF PRODUCING OPTICAL FIBER PREFORM

BACKGROUND OF THE INVENTION

The present invention relates to a method of producing an optical fiber perform. More particularly, it relates to a method of producing an optical fiber preform for obtaining an optical fiber in which at least one of a clad and a jacket effecting important functions in the optical transmission of the optical fiber has an elliptic cross section.

With the progress of optical integrated circuits, the concept of the polarization of light has become important besides the intensity of light which is transmitted through a waveguide. It is required for, e.g., an optical switch to operate in a fixed state of polarization. An optical fiber to be coupled with such optical integrated circuit must have the function of transmitting only a component in the direction of polarization in which the optical integrated circuit operates. Such optical fiber is called the "single-polarization optical fiber", and it becomes important for a transmission line for optical communications and also for measurement use.

As a method of producing such a single-polarization optical fiber, there has been known a method wherein the core or the clad of an optical fiber is made elliptic in cross section and wherein strain birefringence is imparted by utilizing the difference of the thermal expansions of core and clad materials (literature; Electronics Letters, October 1979, page 677, "Strain birefringence in single-polarization germanosilicate optical fibres" by I. P. Kaminow et al.). This method consists in that, after a circular preform rod (optical fiber preform) has been prepared, a partial peripheral surface is ground, whereupon the ground preform rod is drawn at a high temperature, to form the optical fiber having the elliptic core. This method, however, has the disadvantages that complicated steps such as the grinding are required and that the external shape of the optical fiber does not become circular.

In order to make at least either the core or the clad elliptic in cross section without grinding the aforementioned preform rod, the inventors have realized an optical fiber having a predetermined elliptic layer in such a way that, in case a glass thin film were to become a core or a clad is formed on the inner wall of a glass tube by the chemical vapor deposition process (CVD process), and the glass tube is collapsed under heating so as to prepare a solid preform rod, the pressure of the interior of the tube is reduced. With this measure, however, unless the pressure reduction rate and materials are specified, it is sometimes impossible to attain desired characteristics.

The following references are cited to show the state of the art; (i) I. P. Kaminow et al.; Electronics Letters, Vol. 15, No. 21, October 1979, page 677, "Strain Birefringence in Single-Polarisation Germanosilicate Optical Fibres", (ii) V. Ramaswamy et al.; Applied Optics, Vol. 18, No. 24, December 1979, page 4080, "Birefringence in Elliptically Clad Borosilicate Single-Mode Fibers", and (iii) the official gazette of Japanese Laid-open Patent Application No. 56-99306.

SUMMARY OF THE INVENTION

An object of the present invention is to provide a method by which an optical fiber preform for rendering at least one of a clad and a jacket elliptic in cross section is readily produced without restrictions to materials.

In order to accomplish the object, the method of producing an optical fiber preform according to the present invention comprises (i) the step of forming a glass thin film to become a clad layer, a glass thin film to become a jacket layer, or glass thin films to become a jacket layer and a clad layer, on an inner wall of a glass mother tube such as quartz tube, (ii) the step of inserting a glass rod of circular cross section to become a core or a glass rod of circular cross section to become a core and a clad, into the glass mother tube subjected to the step (i), and (iii) the step of heating the glass mother tube with the rod inserted therein, to a predetermined temperature under a state under which a pressure inside said glass mother tube is reduced to be lower, by a predetermined value than an ambient pressure outside said glass mother tube.

An optical fiber to be obtained by drawing the optical fiber preform produced by the method of the present invention has a three-layer structure which consists of the core (a central region through which light passes), the clad (a layer which serves to confine the light into the core, and which adjoins the outer side of the core and exhibits a refractive index lower than that of the core), and a support (the outermost layer which affords a mechanical strength to the optical fiber); or a four-layer structure in which the jacket (a layer which induces strain birefringence) is added between the clad and the support of the aforementioned three-layer structure. In this specification, the parts of the optical fiber preform corresponding to the core, clad, jacket and support of the optical fiber shall be similarly written the core, clad, jacket and support, respectively.

Letting $n_1$ denote the refractive index of the core, $n_2$ that of the clad, and $n_3$ that of the jacket, the following relationship of the indices holds:

$$n_1 < n_3 \geq n_2$$

The formation of each layer in the step (i) can be carried out by the well-known CVD process. The refractive indices may be adjusted by adding well-known dopants to the principal component of the respective materials, for example, $SiO_2$. The glass rod of circular cross section for use in the step (ii) may be made of a glass material which has a predetermined refractive index and which has such a quality that it is applied to the cores of ordinary optical fibers. The material can be readily produced by a well-known method which includes the step of depositing glass of a desired composition from a vapor phase serving as a starting material.

The pressure inside the glass mother tube in the step (iii) is made 1 mm $H_2O$–30 mm $H_2O$ lower than the pressure outside the tube. By heating the tube with its internal pressure thus reduced, the glass thin film or films deposited on the inner surface of the glass mother tube can be rendered elliptic in cross section, and the glass mother tube is rendered solid in the form including the glass rod of circular cross section at the central part thereof. In this way, there is obtained the single-polarization optical fiber which has a circular external shape, in which at least one of the clad and the jacket is elliptic and in which at least the core is circular. When the difference of the pressures inside and outside the tube during the pressure reduction is smaller than 1 mm $H_2O$, the glass film is difficult to become elliptic, and when it is greater than 30 mm $H_2O$, also the outer side (the outer peripheral part, namely, the support) tends to become elliptic, so that both the cases outside the specified range are unfavorable. The heating temperature and the moving speed of a heating source in the step (iii) may be any conditions capable of collapsing the glass mother tube. In case of glass with a high content of silica, the heating temperature is set at 1700° C.–2000° C., and the moving speed of the heating source at 0.02 mm/s–0.4 mm/s. When the heating temperature falls outside the above range, it becomes difficult to render the glass film elliptic. When the moving speed of the heating source is higher than the above speed (the heating time becomes shorter), it is similarly difficult to render the glass film elliptic. On the other hand, when the moving speed is lower than the above speed, an enhanced effect is not especially noted, and rise in cost is incurred. Moreover, the unfavorable diffusion of dopant elements from a layer of higher dopant concentration into a layer of lower dopant concentration arises in some cases.

The heating in the step (iii) is performed in such a way that, while the glass mother tube is being rotated about the axis thereof, the heating source or the glass mother tube is moved in the lengthwise direction of the tube, as in the collapsing step in the production of the conventional optical fiber preform. The rotating speed in this case may be set at 2–200 r.p.m., more preferably 10–100 r.p.m., and the moving speed of the heat source or the tube at 0.02–1.0 mm/sec. When the rotating speed is lower than 2 r.p.m. nonuniformity in the heating is liable to occur in the peripheral direction of the tube, and when it exceeds 200 r.p.m., the effect of rendering the glass thin film elliptic by the pressure reduction tends to become unstable due to an increased centrifugal force, so that both the cases outside the specified range are unfavorable. Further, when the moving speed falls outside the specified range, unfavorably the collapsing becomes unstable.

Letting $b'$ denote the outside radius of the glass mother tube made of quartz into which the high silica glass rod of circular cross section is inserted in the step (ii), $a'$ denote the inside radius of the glass mother tube (a value which does not include the thickness of the glass thin film), $d'$ denote the outside radius of the optical fiber preform to be obtained, and $c'$ denote the average radius of the elliptic layer of the high silica glass thin film rendered elliptic by the heating of the step (iii) ($c'$ is indicated by $\sqrt{c_1 \cdot c_2}$ where $2 c_1$ shall denote the major diameter of the elliptic layer, and $2 c_2$ the minor diameter thereof), the ellipticity $\gamma(\%)$ of the glass thin film of the optical fiber preform to be obtained by the heating under the reduced pressure in the step (iii) is given by:

$$\gamma = 100 \, e^{-A(x-1)^2} \quad (1)$$

Here, $x=(b'/a')\times(d'/c')$ holds. In addition, letter A is a constant which is determined by the pressure reduction rate, and $A=0.344/P$ where P (mm H$_2$O) denotes the difference of the pressures inside and outside the tube during the pressure reduction. In addition, the ellipticity $\gamma(\%)$ is a value indicative of the extent of the ellipse as given by:

$$\gamma = \{(c_1-c_2)/(c_1+c_2)\}\times 100$$

Accordingly, in order to bring the ellipticity $\gamma$ of the glass thin film into a desired value in the case of employing the quartz tube as the glass mother tube and producing the optical fiber preform of the high silica content type, the inside and outside diameters of the quartz tube may be set so as to satisfy Equation (1) (in this case, trial and error based on a simple experiment may well be conjointly adopted). If necessary, a step i') of heating the glass mother tube in a well-known temperature range capable of collapsing it (usually, about 1700°–2000° C. in the case of the quartz tube) to reduce the diameter thereof into a convenient value may be added between the step (i) and the step (ii). In order to cause the optical fiber to exhibit the single polarization, the ellipticity of the glass thin film is set at, at least, 1%. In this manner, the ellipticity of the clad and/or the jacket can be reliably controlled by specifying the materials, the pressure reduction rate, and the radial dimensions of the respective layers.

More detailed description concerning Equation (1) is contained in the specifications of patent applications pending in Japan, U.S. and EPC (Japanese Patent Application No. 56-112137) (the pertinent invention is a prior invention, and is not a prior art).

The thicknesses of the respective layers need to be designed so as to meet Equation (1) in accordance with the desired ellipticity. Concretely, the thickness of the quartz tube should desirably be selected from within a range of 0.5–8 mm, and that of the clad and/or the jacket deposited by the CVD from within a range of 0.05–2 mm.

The insertion of the glass rod of circular cross section into the glass mother tube in the step (ii) should preferably be performed with tools so that the center axis of the rod may coincide with the center axis of the tube. Used as such tools are, for example, glass cylinders each of which has an outside diameter slightly smaller than the inside diameter of the glass mother tube and is centrally provided with a hole having a diameter slightly larger than the outside diameter of the glass rod of circular cross section. The tools numbering two may be installed in the glass mother tube at an interval corresponding to the length of the glass rod. Needless to say, however, the tools for inserting the glass rod of circular cross section are not restricted to the above.

While the situation thus far described is the one in which the glass rod, which is to become the core, has a circular cross section the glass rod of the circular cross section may well be replaced with a glass rod of an elliptic cross section, or a plurality of glass rods for the core may well be used.

In the method of the present invention for producing the optical fiber preform, as regards items not mentioned above, techniques hitherto known in the art may be applied.

BRIEF DESCRIPTION OF THE DRAWINGS

FIG. 2a is a sectional view of a glass mother tube before it is heated with its internal pressure reduced in an embodiment of the present invention, while

FIG. 3 is a sectional view of an optical fiber preform obtained in an example of the present invention, while FIG. 5 is a sectional view of an optical fiber preform obtained in another example of the present invention, while

DESCRIPTION OF THE PRESENTLY PREFERRED EMBODIMENTS

Figure 1:
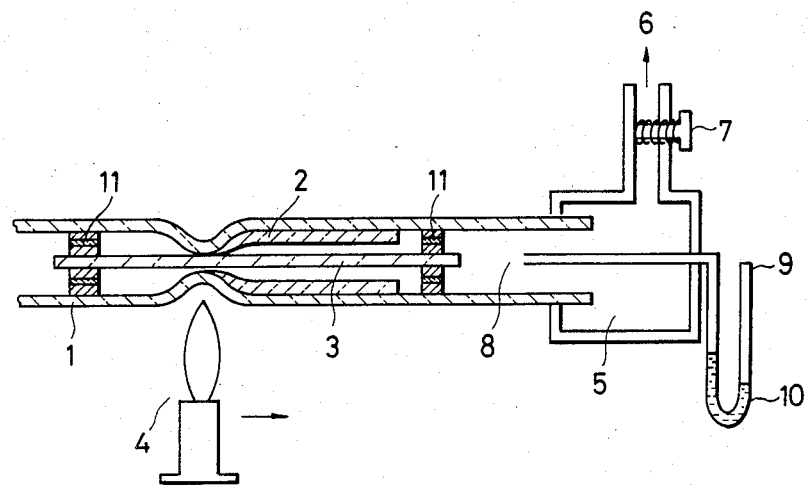
FIG. 1 is an explanatory view showing some of steps in the producing method of the present invention.

Now, the present invention will be described in detail with reference to the drawings. FIG. 1 is an explanatory view showing some of steps of producing a single-polarization optical fiber preform according to the present invention. A glass thin film 2, which will become a clad, is deposited on the inner wall of a glass tube 1 by the ordinary CVD process. A glass rod of circular cross section 3, which will become a core, is inserted into the glass tube, and it is fixed by tools 11 so as to lie centrally of the glass tube 1.

Figure 2A:
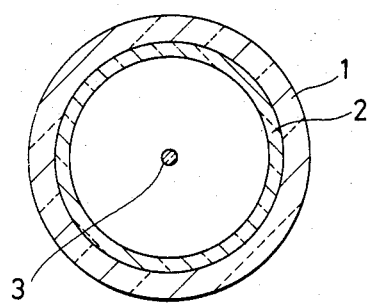
Figure 2B:
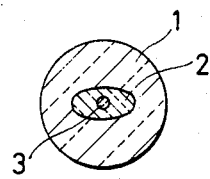
FIG. 2b is a sectional view of an optical fiber preform obtained in such a way that the glass mother tube shown in FIG. 2a is collapsed by heating it with its internal pressure reduced.

The glass tube has one end closed, and it is set on a glass lathe (not shown) and is rotated at a fixed speed of rotation. Simultaneously, the tube is heated by a burner 4. At this time, a vacuum tank 5 is disposed at the open part of the glass tube, and the internal pressure of the tube is reduced through a vacuum tube 6 while a vacuum adjusting valve 7 is being regulated. The amount of the pressure reduction is measured by the difference of the levels of a liquid 10 contained in a U-tube 9 one end of which is inserted in the interior 8 of the glass tube. When the tube has its diameter decreased on while being heated with its internal pressure reduced in this manner, the glass layer formed by the CVD process collapses while becoming elliptic, not circular, owing to the minute difference of the wall thickness of the starting quartz tube shown in FIG. 2a, etc., and eventually, the optical fiber preform which is solid as shown in FIG. 2b is formed. Here, the cross-sectional shape of the glass rod 3 for the core need not always be circular, but it may well be elliptic, and a plurality of rods for the core may well be inserted. In addition, the glass rod to be inserted may well be composed of a core and a clad. In this regard, in the case where the rod to be inserted is composed only of the core, it is the clad lower in the refractive index than the core that is deposited in the glass tube 1 by the CVD process, and in the case where the rod to be inserted is composed of the core and the clad, it is a jacket substantially equal in the refractive index to the clad that is deposited in the glass tube 1 by the CVD process.

EXAMPLE 1

Figure 3:
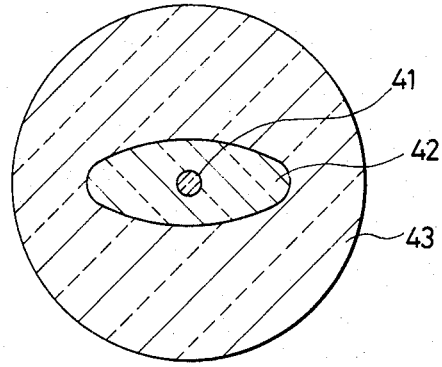
Figure 4:
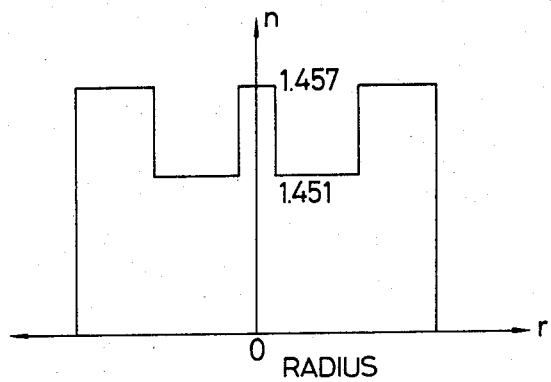
FIG. 4 is a graph showing the refractive index profile of the optical fiber preform in the example.

Glass having a composition consisting of 15 mol% of $B_2O_3$ and 85 mol% of $SiO_2$ was deposited on the inner wall surface of a quartz tube (18 mm in outside diameter and 15 mm in inside diameter) to a thickness of 180 $\mu$m by the CVD process. The resultant quartz tube was heated to 1700° C., into a concentric quartz tube having an inside diameter of about 5 mm and an outside diameter of about 11 mm. A synthetic quartz glass rod (Sprasil; trade name of Heraus-Schot Co. in West Germany) having an outside diameter of 1 mm was inserted into the quartz tube. Subsequently, the internal pressure of the tube was reduced by 8 mm in terms of the height of water as compared with the atmospheric pressure, and the quartz tube was heated to 1800° C. from outside to be collapsed, under the conditions of 20 r.p.m. in the rotating speed of the quartz tube and 0.2 mm/sec in the moving speed of a burner. Thus, an optical fiber preform having a cross-sectional shape as shown in FIG. 3 was produced. At this time, the ellipticity of a clad (the ellipticity $(\gamma)=(b-a)/(b+a)$ where a denotes the minor diameter and b of the major diameter) was about 40%. The index profile of this preform is shown in FIG. 4. In FIG. 3, numerals 41, 42 and 43 designate a core, the clad and a support, respectively.

The optical fiber preform obtained in this example was drawn in well-known fashion, to produce an optical fiber. When the extinction ratio of the optical fiber for a length of 500 m was measured at a wavelength of 0.633 $\mu$m, it was −30 dB, which verified the excellent polarization holding of the optical fiber.

EXAMPLE 2

Figure 5:
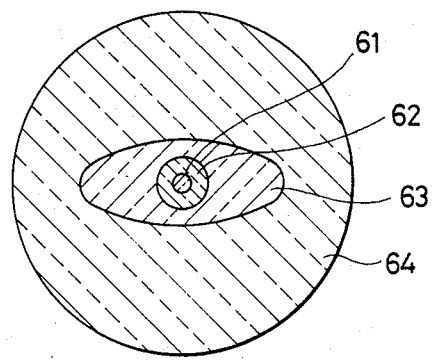
Figure 6:
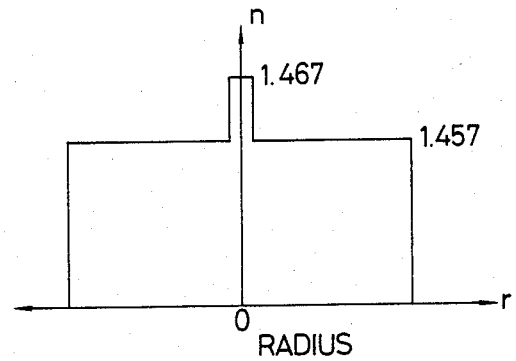
FIG. 6 is a graph showing the refractive index profile of the optical fiber preform in the example.

Glass having a composition consisting of 15 mol% of $B_2O_3$, 4 mol% of $GeO_2$ and 81 mol% of $SiO_2$ was deposited on the inner wall of the quartz tube described in Example 1, to a thickness of 180 $\mu$m by the CVD process. The resultant quartz tube was heated to 1700° C., into a concentric quartz tube having an inside diameter of 5 mm and an outside diameter of 11 mm. A synthetic quartz rod (having a diameter of 2.5 mm and prepared by the VAD (vapor phase axial deposition) process in a concentric double structure which has a silica glass layer around synthetic quartz having an outside diameter of 1 mm and doped with 10 mol% of $GeO_2$ was inserted into the quartz tube. The internal pressure of the tube was reduced by 8 mm in terms of the height of water as compared with the atmospheric pressure, and the quartz tube was heated to 1900° C. from outside, under the conditions of 30 r.p.m. in the rotating speed of the tube and 0.25 mm/sec in the moving speed of a burner. Thus, the quartz tube was made solid to produce an optical fiber preform. The optical fiber preform obtained had an outside diameter of about 9.9 mm. As shown in FIG. 5, it had a four-layer cross-sectional structure consisting of a circular core portion 61 doped with $GeO_2$, a circular clad of $SiO_2$ 62, an elliptic jacket 63, and a support of $SiO_2$ 64. Its index profile is shown in FIG. 6.

The optical fiber preform obtained in this example was drawn in well-known fashion into an optical fiber. When the extinction ratio of the optical fiber for a length of 500 m was measured at a wavelength of 0.633 $\mu$m, it was −35 dB, and excellent polarization holding was exhibited. The transmission loss at a wavelength of 1.55 $\mu$m was 0.9 dB/km.

Obviously many modifications and variations of the present invention are possible in the light of the above teachings. It is therefore to be understood that within the scope of the appended claims the invention may be practiced otherwise than as specifically described.

What is claimed is:

1. A method of producing an optical fiber preform comprising (i) forming a glass thin film to become a clad layer, a glass thin film to become a jacket layer, or glass thin films to become a jacket layer and a clad layer, on a inner wall of a glass mother tube, (ii) inserting a glass rod to become a core or a glass rod to become a core and a clad, into said glass mother tube, and (iii) heating the glass mother tube, with said glass rod inserted therein, to a predetermined temperature and at a pressure inside said glass mother tube which is reduced to a value lower than a pressure outside said glass mother tube, to thereby make said glass thin film or films into an elliptical shape and to make said glass mother tube, said glass thin film or films and said glass rod solid.

2. A method of producing an optical fiber preform as defined in claim 1, wherein at the step (iii), the pressure inside said glass mother tube is 1 mm −30 mm lower in terms of height of water as compared with the pressure outside the glass mother tube.

3. A method of producing an optical fiber preform as defined in claim 1, wherein at the step (iii), the glass mother tube is heated to 1700° C.-2000° C.

4. A method of producing an optical fiber preform as defined in claim 1, further including (i') heating the glass mother tube having said glass thin film or glass thin films thereon, to decrease a diameter thereof, between the step (i) and the step (ii).

5. A method of producing an optical fiber preform comprising:

forming at least one thin film on an inner wall of a support;

inserting a rod into said support;

reducing the pressure inside said support to a pressure lower than a pressure outside said support;

rotating said support and rod, and heating said support to a temperature such that said support, said at least one thin film and said rod, becomes a solid fiber preform, to thereby render said at least one thin film deposited on the inner surface of the support elliptic in cross section.

6. A method of producing an optical fiber preform as defined in claim 5, wherein said at least one thin film is at least one of a clad layer and a jacket layer.

7. A method of producing an optical fiber preform as defined in claim 5, wherein said rod has a circular cross section.

8. A method of producing an optical fiber preform as defined in claim 7, wherein said rod is a glass rod.

9. A method of producing an optical fiber preform as defined in claim 7, wherein said rod has a clad layer thereon.

10. A method of producing an optical fiber preform as defined in claim 5, wherein said at least one thin film is formed on said inner wall of said support by chemical vapor deposition.

11. A method of producing an optical fiber preform as defined in claim 5, wherein said pressure inside said support is 1 mm-30 mm lower than the pressure outside said support as measured in terms of the height of water.

12. A method of producing an optical fiber preform as defined in claim 5, wherein said rod retains its circular shape after said heating.

13. A method of producing an optical fiber preform as defined in claim 5, wherein said support is heated to a temperature of 1700°-2000° C.

14. A method of producing an optical fiber preform as defined in claim 5, wherein said support and said rod are rotated at a speed of 2-200 r.p.m.

15. A method of producing an optical fiber preform as defined in claim 5, wherein said heating is performed using a moving heating source, said heating source moving at a speed of 0.02-1.0 mm/sec.

16. A method of producing an optical fiber preform as defined in claim 5, wherein the ellipticity of said at least one thin film is at least 1%.

17. A method of producing an optical fiber preform as defined in claim 5, wherein the thickness of said support is within a range of 0.5-8 mm.

18. A method of producing an optical fiber preform as defined in claim 5, wherein the thickness of said at least one film is within a range of 0.05-2 mm.

19. A method of producing an optical fiber preform as defined in claim 5, wherein said rod is inserted into said support so that the center axis of the core coincides with the center axis of said support.

20. A method of producing an optical fiber preform as defined in claim 1, wherein said glass thin film or glass thin films is formed by chemical vapor deposition.

21. A method of producing an optical fiber preform as defined in claim 1, wherein said ellipticity of said glass thin film or glass thin films is at least 1%.

* * * * *